(12) United States Patent
Avedissian et al.

(10) Patent No.: US 8,635,169 B2
(45) Date of Patent: *Jan. 21, 2014

(54) SYSTEM AND METHODS FOR PROVIDING USER GENERATED VIDEO REVIEWS

(75) Inventors: Narb Avedissian, Studio City, CA (US); Nikhil Sreenath, North Las Vegas, NV (US)

(73) Assignee: Scorpcast, LLC, Las Vegas, NV (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/451,478

(22) Filed: Apr. 19, 2012

(65) Prior Publication Data

US 2013/0282611 A1 Oct. 24, 2013

(51) Int. Cl.
*G06Q 30/00* (2012.01)
*G06Q 10/00* (2012.01)
*H04N 7/16* (2011.01)

(52) U.S. Cl.
USPC .............................. 705/347; 705/1.1; 725/23

(58) Field of Classification Search
USPC ......................................................... 705/347
See application file for complete search history.

(56) References Cited

U.S. PATENT DOCUMENTS

| | | | |
|---|---|---|---|
| 7,664,678 B1 * | 2/2010 | Haber | 705/26.9 |
| 8,312,486 B1 | 11/2012 | Briggs et al. | |
| 2008/0040235 A1 | 2/2008 | Avedissian | |
| 2008/0050713 A1 | 2/2008 | Avedissian | |
| 2008/0050714 A1 | 2/2008 | Avedissian | |
| 2008/0104626 A1 | 5/2008 | Avedissian | |
| 2008/0178230 A1 | 7/2008 | Eyal | |
| 2009/0307092 A1 * | 12/2009 | Gugliuzza et al. | 705/14.64 |
| 2010/0269144 A1 | 10/2010 | Forsman | |
| 2010/0332283 A1 * | 12/2010 | Ng et al. | 705/9 |
| 2011/0231260 A1 * | 9/2011 | Price | 705/14.61 |

OTHER PUBLICATIONS

"How to create google video sitemap urls for very large video files with distinct segments"; Dec. 6, 2011, 1 Page; downloaded from http://webmasters.stackexchange.com/questions/23021/how-to-create-google-video-sitemap-urls-for-very-large-video-files-with-distinct.*

* cited by examiner

*Primary Examiner* — Jami A Plucinski
*Assistant Examiner* — Ehrin Pratt
(74) *Attorney, Agent, or Firm* — Knobbe, Martens, Olson & Bear LLP

(57) ABSTRACT

A system and method that obtains and publishes user generated video product reviews by generating a user account and receiving a user generated video review associated with the user account, where the user generated video review comprises audio and video data featuring a reviewed product. A product tag associated with the reviewed product is received. A product description is associated to the reviewed product based on the product tag. The user generated video review is approved if a set of criteria are met. An incentive is distributed to the user account associated with the user generated video review. The user generated video review is stored to a database comprising a plurality of user generated video reviews. The user generated video review is published.

20 Claims, 6 Drawing Sheets

SYSTEM AND METHODS FOR PROVIDING USER GENERATED VIDEO REVIEWS

BACKGROUND OF THE INVENTION

1. Field of the Invention

The present invention relates to content sharing, and more specifically, to providing user generated video reviews.

2. Description of the Related Art

The broad accessibility of internet, along with the increasing popularity of affordable digital video recording devices has led to the proliferation of user generated videos shared over the internet. There is now an opportunity to leverage the popularity of user generated videos into a convenient, efficient, and entertaining method for dissemination of information regarding consumer goods and services.

U.S. patent application Ser. No. 12/494,425 discloses a computer system that hosts a web site allowing users via the Internet to post video clips, view video clips, or provide feedback regarding a viewed video clip, wherein the computer system selects the most popular video clips based on certain criteria to make available to a video service provider. In one embodiment, the computer system transcodes the video clip received at the web site into a format compatible with a VOD system associated with a cable service provider, and generates the appropriate metadata based on input from the user posting the video clip based in part on values determined by the computer system and based in part on default values determined by an administrator. Subscribers to a cable service provider can then select and view the video clips in the VOD system by invoking a VOD service offered by the cable service provider.

U.S. patent application Ser. No. 11/950,158 discloses a method for use in providing content that includes hosting a network site on a computer network, displaying on the network site links to one or more videos, and displaying on the network site at least an on-demand preview of a first video in response to a corresponding one of the links being selected. A storage medium stores a computer program for use on a client computer.

None of these disclosures, either individually or in combination, discloses the features of the present invention as claimed.

BRIEF SUMMARY OF THE INVENTION

One or more embodiments of the system and methods for providing user generated user reviews described herein provide for a user generated video product review platform. One embodiment is a method that obtains and publishes user generated video product reviews by generating a user account and receiving a user generated video review associated with the user account, where the user generated video review comprises audio and video data featuring a reviewed product. A product tag associated with the reviewed product is received. A product description is associated to the reviewed product based on the product tag. The user generated video review is approved if a set of criteria are met. The user generated video review is stored to a database comprising a plurality of user generated video reviews. The user generated video review is published. An incentive is distributed to the user account associated with the user generated video review.

These and other aspects of the present invention will become more fully understood upon further review of the following specifications and accompanying drawings.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A product review platform will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the true scope of the invention.

Figure 1:
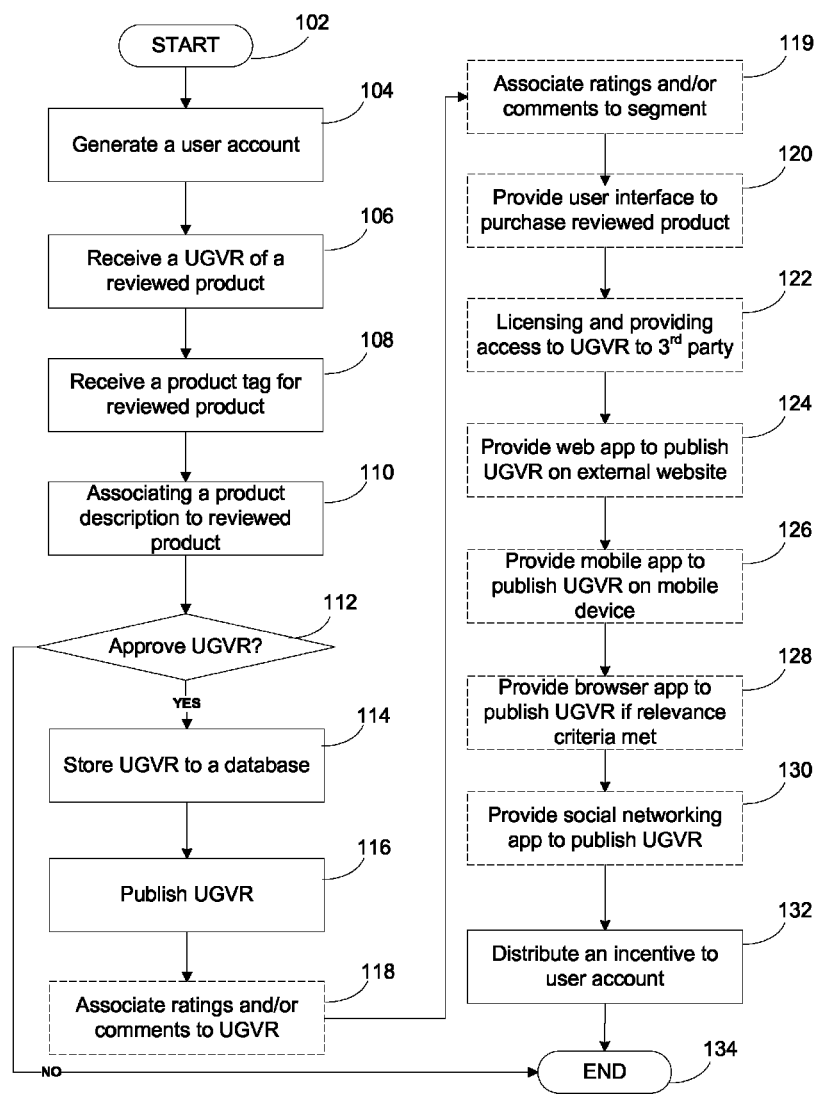
FIG. 1 illustrates a flowchart of an exemplary method in accordance with the system and methods for providing user generated user reviews described herein.

FIG. 1 illustrates a flowchart of an exemplary method in accordance with the system and methods for providing user generated user reviews described herein. A user account is generated at step 104. The user account may be generated for use on a host website by a registered user. The host website may be addressed to an unique domain name and be publically accessible by desktop computers, mobile computers, tablet computers, and mobile phones with a wired or wireless interne network connection. The host website may provide an interface to a registered user of the host website for generating a user account associated with the registered user. The registered user may be requested to provide to the host website a set of user account information. In some embodiments, the set of user account information comprises name, screen name, password, residential address, email address, phone number, age, sex, and other information. The user account may be one of thousands or millions of user accounts generated for use on the host website. To confirm the identity of the registered user for subsequent access of the host website, the registered user is prompted to log-in by entering the registered user's screen name and password. If the registered user's entered screen name and password matches the previously provided screen name and password, then the registered user is given reviewer access to the host website and is identified and tracked by the user account. Compared to someone without a successful log-in into a user account, the registered user may be granted additional access to the host website after a successful log-in into the user account.

Figure 3:
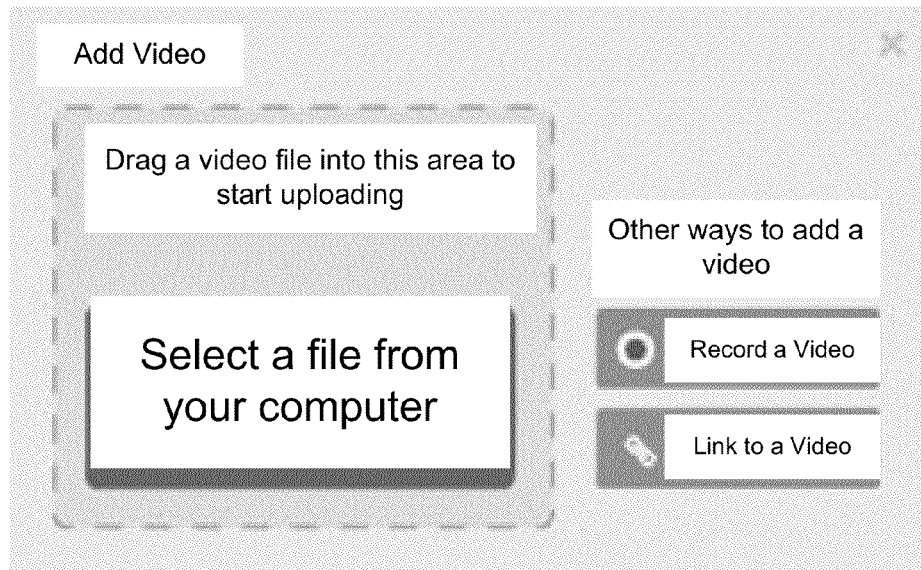
FIG. 3 illustrates an exemplary screenshot of sending a user generated video review in accordance with the system and methods for providing user generated user reviews described herein.
Figure 4:
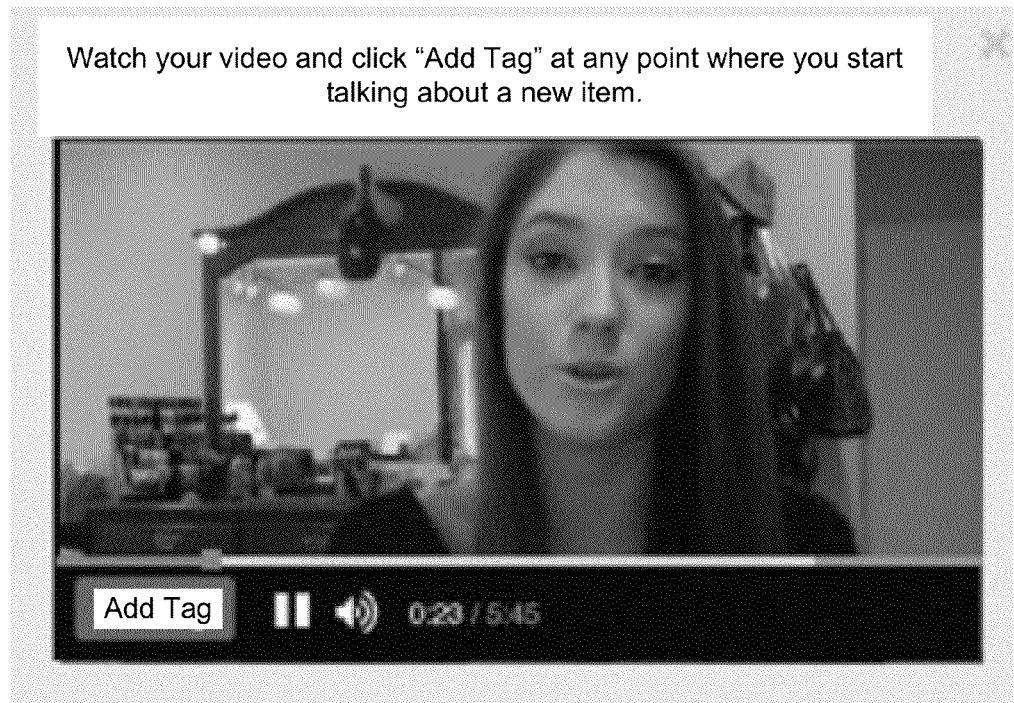
FIG. 4 illustrates an exemplary screenshot of creating a product tag in accordance with the system and methods for providing user generated user reviews described herein.
Figure 5:
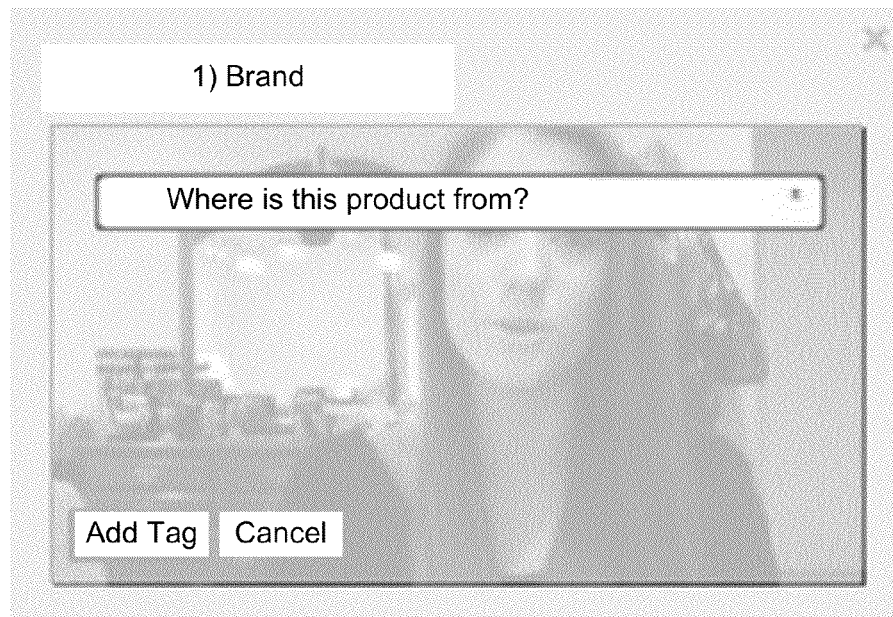
FIG. 5 illustrates an exemplary screenshot of creating a product tag in accordance with the system and methods for providing user generated user reviews described herein.
Figure 6:
FIG. 6 illustrates an exemplary screenshot of creating a product tag in accordance with the system and methods for providing user generated user reviews described herein.
Figure 7:
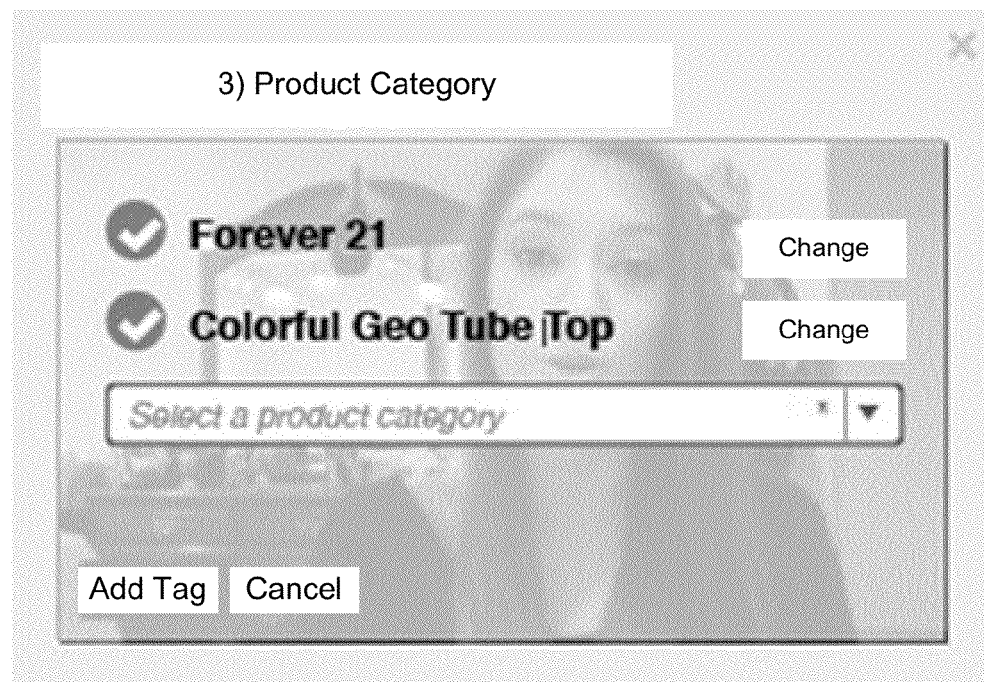
FIG. 7 illustrates an exemplary screenshot of creating a product tag in accordance with the system and methods for providing user generated user reviews described herein.
Figure 8:
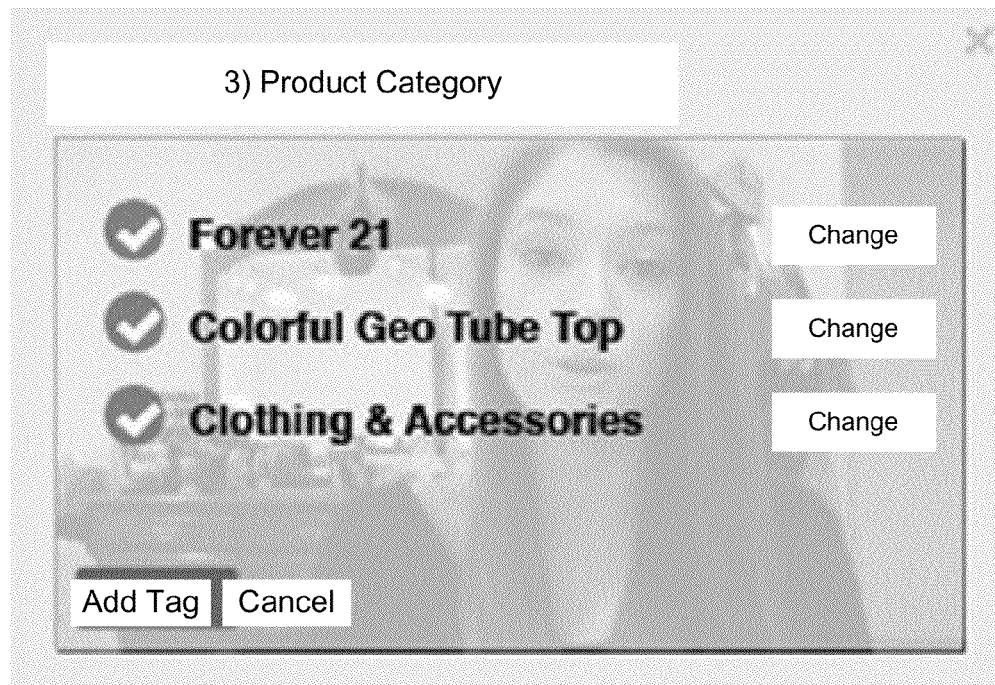
FIG. 8 illustrates an exemplary screenshot of creating a product tag in accordance with the system and methods for providing user generated user reviews described herein.

In some embodiments, once the registered user has a successful log-in into the user account, the registered user may send a user generated video review to be received by the host website at step 106. FIG. 3 illustrates an exemplary screenshot of sending a user generated video review in accordance with the system and methods for providing user generated user reviews described herein. The user generated video review comprises audio and video data which may be sent from a desktop computer or a mobile device. The mobile device may be a notebook computer, tablet computer, mobile phone, or any portable electronic device able to communicate with the host website. The user generated video review should ideally provide useful information about a reviewed product to a viewer of the user generated video review. The viewer of the user generated video review will most typically be a potential costumer for the reviewed product featured in the user generated video review. A user generated video review that features a reviewed product may include useful information to a potential costumer such as a demonstration of the unpacking of the product, visual views of the product from different angles and distances, visual and audio demonstrations of uses or functionality, and spoken descriptions of the reviewed product. As an example, the user generated video review featuring a new mobile phone may begin with the registered user unboxing a newly purchased mobile phone, assembling the mobile phone, turning the mobile phone around in the hands, turning the mobile phone on, and using a few of the mobile phone's functions. At the same time, the registered user may speak of facts and opinions on the packaging, visual appearance, and usefulness of the features of the mobile phone.

The registered user may choose to upload a video file, record a video, or link a video of the user generated video review to be received by the host website. Uploading a video may be accomplished by having a preexisting video file ready and sending the preexisting video file to the host website. In some embodiments, the preexisting video file may have been created by a video recorder such as a digital camera, digital camcorder, a webcam, a tablet, a mobile phone, or some other video recording hardware. The preexisting video file may be in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. The preexisting video file may be stored on a solid state disk drive, hard disk drive, random access memory, or some other digital storage medium. An upper and lower limit may be placed to on the preexisting video file to restrict the file size or the length of video.

The registered user may also choose to record a video instead of uploading a preexisting video file. The registered user may record the user generated video review with a digital camera, digital camcorder, a webcam, a tablet, a mobile phone, or some other video recording hardware. Video data may be sent live and piecemeal as a stream by the registered user and received by the host website. The streamed video data may be in a raw or compressed format.

The registered user may instead link a video as another option. The registered user may specify of a network-accessible location of a preexisting video of the user generated video review. The preexisting video may be located on any network-accessible location such as an external website, an ftp server, or an online database. The host website finds the user generated video review based on the network-accessible location specified by the registered user.

In some embodiments, the user generated video review is received from an interactive kiosk. The interactive kiosk may be located in a shopping center or retail store. The interactive kiosk may be a station equipped with a video recorder and an internet network connection. A shopper may carry a store item to the kiosk in a shopping center or retail store and immediately create and send a user generated video review.

The host website receives a product tag associated with the reviewed product at step 108. The product tag may be created by the registered user as words or phrases which accurately describe the reviewed product FIG. 4-8 illustrates exemplary screenshots of creating a product tag in accordance with the system and methods for providing user generated user reviews described herein. The product tag may include words or phrases identifying brand, model, size, color, visual traits, functional specifications, uses, and other descriptive text.

In some embodiments, the product tag may be received by obtaining a barcode data and executing a product tag search to identify a product tag based on the barcode data. The barcode data may be extracted by scanning a barcode label. Scanning refers to any method of extracting barcode data from a barcode label, including but not limited to using a pen-type reader, laser scanner, or a camera from a mobile device. Barcode data may be a partial or full image, number or other identifying data. The product tag search may be executed by a mobile device or by the host website.

The product tag is used to associate a product description to the reviewed product at step 110. In some embodiments, the product description contains text describing brand, model, size, color, visual traits, functional specifications, uses, and other descriptive information. The text may be obtained from the registered user, individuals experienced with the reviewed product, manufacturer or seller of the reviewed product, encyclopedia, journal, magazine, or product description database. In some embodiments, a product description search is executed to identify the product description. The product description search may search a description database or other digital sources using the product tag to identify an appropriate product description for the reviewed product.

In some embodiments, the user generated video review features at least one additional reviewed product, where each reviewed product associates with a different video segment in the user generated video review. In these embodiments, the user generated video review includes a plurality of video segments. Each video segment individually associates with a reviewed product which is associated with a product tag. The registered user individually creates a product tag and defines a video segment to associate with each reviewed product.

In some embodiments, each reviewed product in the user generated user review is additionally associated with a tagged portion of a display area of the user generated video review. The display area of the user generated video review is an area of a display screen containing dimensions of the video of the video generated video review. The tagged portion of the display area contains dimensions of the visual representation of each reviewed product. The tagged portion of the display area associated with the reviewed product may change in size and location during the video segment associated with the reviewed product.

In some embodiments, the user generated video review may be edited by the registered user on the host website. Editing refers to any method of altering the user generated video review, including but not limited to shortening the length of the user generated video review by removing selected segments or altering the brightness, contrast, or colors of the user generated video review.

The user generated video review is approved if a set of criteria are met at step 112. The set of criteria helps ensure that the user generated video review is sufficiently useful to a viewer. Criterion may include suitability of product tags, length, visual quality, audio quality, clarity of speech, usefulness of review, identity of said reviewed product, or identity of said user account. For example, the preexisting video file may be limited to a file size of 5 megabytes to 500 megabytes and the length of video may be limited to 15 seconds to 15 minutes. Limiting the size and length of the user generated video review has a useful effect of eliminating preexisting video files which likely do not contain enough desirable content or contains too much undesirable content. In another example, visual quality may be enforced by not approving videos with a resolution below 640×480 pixels or 480p. The approval process for the user generated video review may be manual or may be partially or fully automated by a software algorithm. A user generated review that is not approved will not be published on the host website at step 134.

The user generated video review is stored to a database comprising a plurality of user generated video reviews at step 114. The user generated video review is stored as a video file in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. In some embodiments, the database includes at least one computer storage medium with a network connection to the host website. The user generated video review may be stored on database for an indefinite period of time until a decision is made to delete the user generated video review. In some cases, the user generated user review will be deleted from the database based on date of creation, the existence of newer user generated video reviews featuring the same reviewed product, video rating, or user account rating. As an example, a user generated video review that is over a year old, have fewer than 10 views in 6 months, or have a video rating below a certain threshold. The database may store multiple copies of the user generated video review in multiple computer storage mediums. This forms a backup enabled system so that the user generated video review will not be lost in the event a computer storage medium fails.

The user generated video review is published at step 116. In some embodiments, the user generated video review is made available to all viewers of the host website and the user generated video review may be found and viewed by any viewer without a log-in process. This allows the host website to provide a plurality of user generated video reviews as a free service to the public. In another embodiment, the user generated video review is made available to only a set of viewers and may only be viewed by viewers who have completed a log-in process.

The host website may implement an interface to allow a viewer to find user generated video reviews pertaining to the viewer's interest from the plurality of user generated video reviews available on the database. One such interface may be a search tool which allows a viewer to enter a word or phrase describing a brand, model, size, color, visual traits, functional specifications, uses, or another characteristic of a reviewed product. With a software algorithm, the search tool attempts to find at least one user generated video review that features a relevant reviewed product based on the word or phrase entered. If the software algorithm finds more than one relevant user generated video review result, the software algorithm may sort the results according to a relevance criterion such as date of creation of the user generated video review result. In the embodiments where the user generated video review features a plurality of reviewed products and each reviewed product associates with a different video segment, the search tool will additionally find the relevant video segment.

Another interface is to allow the viewer to find a user generated video review by selecting a main category of reviewed products then navigating through at least one subcategory. A user generated video review, or a video segment in a user generated video reviews which feature a plurality of reviewed products, may be organized into categories and subcategories based on brand, model, size, color, visual traits, functional specifications, uses, or another characteristic of the reviewed product.

In some embodiments, a video rating may be associated with the user generated video review based on a collection of input from viewers of the user generated video review at step 118. A user account rating may then be assigned to the user account based on the video ratings of each of the user generated video reviews received from the user account. In some embodiments, the video rating or the user account rating have an effect on the incentive distributed to the user account.

In some embodiments, a segment rating may be individually associated with each video segment featuring each reviewed product in the user generated video review at step 119. The segment rating is based on a collection of input from viewers of the video segment. User generated comments may also be individually associated with each video segment featuring each reviewed product in the user generated video review at step 119.

In some embodiments, a user interface is provided to allow a viewer of a user generated video review to purchase the reviewed product featured in the user generated video review at step 120. The user interface may be a hypertext transfer protocol link that allows the viewer to quickly navigate a browser to an external website to purchase the reviewed product. The user interface may allow the viewer to directly purchase the reviewed product from the host website using common tools of online shopping known in art. The user interface may also provide instructions on methods that the viewer may apply to purchase the reviewed product. In some embodiments, the interface allows the viewer to select the tagged portion of a display area associated with the reviewed product to purchase the reviewed product. A display area of the user generated video review is an area of a display screen containing dimensions of the video of the video generated video review.

In some embodiments, the user generated video review may be licensed to a third party to provide access to the user generated review to the third party at step 122. Licensing access to the user generated video reviews is an effective method of monetizing the value of the plurality of user generated video reviews stored on the database. Third parties include suppliers, retailers, online shopping websites, online informational websites, external databases, mobile device manufacturers, software developers, and other such entities. In some embodiments, the third party may be monetarily charged for each user generated video review accessed. In some other embodiments with a subscription system, the third party may be charged monthly or yearly for access to a large set of user generated video reviews.

Figure 9:
FIG. 9 illustrates an exemplary screenshot of a web application for publishing a user generated video review in accordance with the system and methods for providing user generated user reviews described herein.

In some embodiments, a web application is provided to publish the user generated video review on an external website at step 124. FIG. 9 illustrates an exemplary screenshot of a web application for publishing a user generated video review in accordance with the system and methods for providing user generated user reviews described herein. The web application may be a software program for a video player to be embedded on the external website. It is contemplated that an external website containing a web content will use the web application to embed the video player to play a user generated video review featuring a reviewed product that is related to the web content. A user of the external website may view a user generated video review with the web application on the external website. In some embodiments, a mobile application is provided to publish the user generated video review on a mobile device at step 126. A user of the mobile device may view a user generated video review with the mobile application on the mobile device.

In some embodiments, a browser application is provided to a browser, where the browser application publishes the user generated video review on the browser if a set of relevance criteria are met at step 128. The relevance criteria compares the reviewed product featured in the user generated video review with a content displayed on the browser. An example implementation of this embodiment allows a user performing a search on a search engine in the browser to view a user generated video review featuring a reviewed product related to the search on the search engine.

In some embodiments, a social networking application is provided where the social networking application publishes the user generated video review on a social networking website at step 130. A viewer of the user generated video review may use the social networking application to display the user generated video review on a social networking website. Users of the social networking website may then view the user generated video review on the social networking website. In some embodiments, the users of the social networking website may specify whether they "like" or "dislike" the user generated video review or purchase the reviewed product featured in the user generated video review.

An incentive is distributed to the user account associated with the user generated video review at step 132. The incentive acts as a reward to the registered user for creating an approved user generated review and as a motivation to create more user generated video reviews in the future. Incentives may be distributed based on criteria such as but not limited to the number of approved user generated reviews received from the user account, the quality of the registered user's user generated video reviews, the number of views for the user generated video review, the ratings given by viewers of the user generated video review, or the number of people who "like" the user generated video review on a social networking website. Incentives may be distributed based on advertising revenue the host website received in connection with the user generated video review. Incentives may be distributed based on sales revenue received in connection with purchases of the reviewed product featured in the user generated video review. Incentives may be distributed based on licensing fees from third parties for access to the user generated review. In some embodiments, the incentive may include monetary sums and be distributed to the registered user by check, electronic wire transfer, store gift card, or online shopping credit. The incentive may include a visually distinguishable and prestigious design which highlights the registered user's reviewing abilities or the registered user's quality of video reviews. The incentive may include points which may be used for discounts on new products that are affiliated with the host website.

Figure 2:
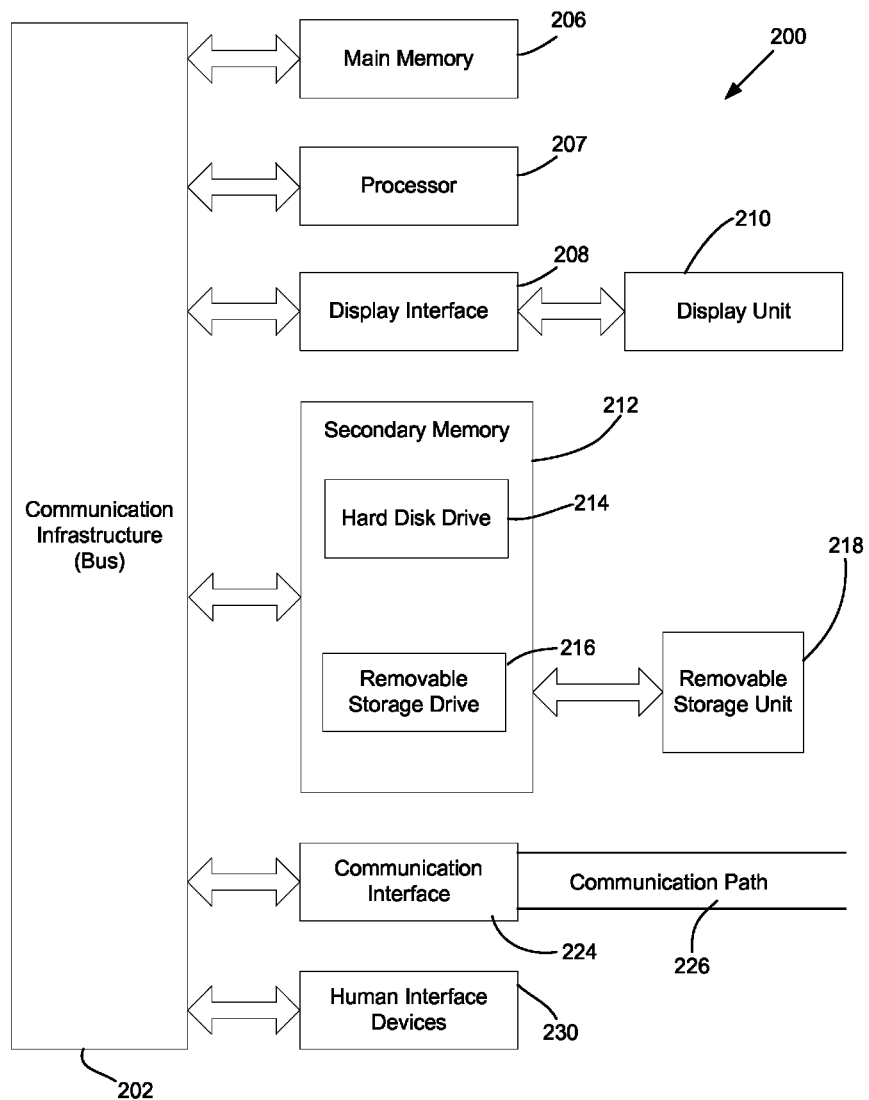
FIG. 2 illustrates a computer system in accordance with the system and methods for providing user generated user reviews described herein.

FIG. 2 illustrates a computer system in accordance with the system and methods for providing user generated user reviews described herein. A general-purpose computer and peripherals, when programmed as described herein, may operate as a specially programmed computer 200 capable of implementing one or more methods, apparatus and/or systems of the solution described in this disclosure. A processor 207 may be coupled to a bi-directional communication infrastructure 202 such as communication infrastructure system 202. The communication infrastructure 202 may generally be a system bus that provides an interface to the other components in the general-purpose computer system such as the processor 207, a main memory 206, a display interface 208, a secondary memory 212, and/or a communication interface 224.

The main memory 206 may provide a computer-readable medium for accessing and executed stored data and applications. The display interface 208 may communicate with a display unit 210 that may be utilized to display outputs to a user of the specially programmed computer 200. The display unit 210 may comprise one or more monitors that may visually depict aspects of the computer program to the user. The main memory 206 and the display interface 108 may be coupled to the communication infrastructure 202, which may serve as the interface point to the secondary memory 212 and the communication interface 224. The secondary memory 212 may provide additional computer-readable medium resources beyond the main memory 206, and may generally function as a storage location for computer-readable instructions to be executed by processor 207. Either fixed or removable computer-readable media may serve as the secondary memory 212. The secondary memory 212 may comprise, for example, a hard disk 214 and a removable storage drive 216 that may have an associated removable storage unit 218. There may be multiple sources of the secondary memory 212 and systems implementing the solutions described in this disclosure may be configured as needed to support the data storage requirements of the user and the methods described herein. Numerous types of data storage devices may serve as repositories for data utilized by the specially programmed computer 200. For example, random access memory, read-only memory, solid-state storage, magnetic storage, optical or magnetic-optical storage, or any other available mass storage technology that provides a repository for digital information may be used.

The communication interface 224 may be coupled to the communication infrastructure 202 and may serve as a conduit for data destined for or received from a communication path 226. A network interface card (NIC) is an example of the type of device that once coupled to the communication infrastructure 202 may provide a mechanism for transporting data to the communication path 226. Computer networks such Local Area Networks (LAN), Wide Area Networks (WAN), Wireless networks, optical networks, distributed networks, the Internet or any combination thereof are some examples of the type of communication paths that may be utilized by the specially programmed computer 200. The communication path 226 may comprise any type of telecommunication network or interconnection fabric that can transport data to and from communication interface 224.

To facilitate user interaction with the specially programmed computer 200, one or more human interface devices (HID) 230 may be provided. Some examples of HIDs that enable users to input commands or data to the specially programmed computer 200 may comprise a keyboard, mouse, touch screen devices, microphones or other audio interface devices, motion sensors or the like, as well as any other device able to accept any kind of human input and in turn communicate that input to processor 207 to trigger one or more responses from the specially programmed computer 200 are within the scope of the system disclosed herein.

While FIG. 2 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 2.

The computer-readable medium may store computer-readable instructions. The processor 207 executes the computer-readable instructions to accept a plurality of licensees. Each licensee may be an individual person, a group of persons, or business entities. Licensees may be recruited in-person, over the telephone, or on an Internet website. Licensees may be self-recruited or may be recruited by another entity. Self-recruitment may be accomplished by submitting information on an Internet website. Preferably, licensees will be entities with sales expertise, with knowledge of customer needs, with knowledge of consumer trends, with skill in business development, or with any other similarly desirable quality.

The processor 207 executes the computer-readable instructions to generate a user account. The user account may be generated for use on a host website by a registered user. The host website may be addressed to an unique domain name and be publically accessible by desktop computers, mobile computers, tablets, and mobile phones with a wired or wireless internet network connection. The host website may provide an interface to a registered user of the host website for generating a user account associated with the registered user. The registered user may be requested to provide to the host website a set of user account information. In some embodiments, the set of user account information comprises name, screen name, password, residential address, email address, phone number, age, sex, and other information. The user account may be one of thousands or millions of user accounts generated for use on the host website. To confirm the identity of the registered user for subsequent access of the host website, the registered user is prompted to log-in by entering the registered user's screen name and password. If the registered user's entered screen name and password matches the previously provided screen name and password, then the registered user is given reviewer access to the host website and is identified and tracked by the user account. Compared to someone without a successful log-in into a user account, the registered user may be granted additional access to the host website after a successful log-in into the user account.

The processor 207 executes the computer-readable instructions to receive a user generated video review associated with the user account, where the user generated video review features at least one reviewed product. The user generated video review comprises audio and video data which may be sent from a desktop computer or a mobile device. The mobile device may be a notebook computer, tablet computer, mobile phone, or any portable electronic device able to communicate with the host website. The user generated video review should ideally provide useful information about a reviewed product to a viewer of the user generated video review. The viewer of the user generated video review will most typically be a potential costumer for the reviewed product featured in the user generated video review. A user generated video review that features a reviewed product may include useful information to a potential costumer such as a demonstration of the unpacking of the product, visual views of the product from different angles and distances, visual and audio demonstrations of uses or functionality, and spoken descriptions of the reviewed product.

The registered user may choose to upload a video file, record a video, or link a video of the user generated video review to be received by the host website. Uploading a video may be accomplished by having a preexisting video file ready and sending the preexisting video file to the host website. In some embodiments, the preexisting video file may have been created by a video recorder such as a digital camera, digital camcorder, a webcam, a tablet, a mobile phone, or some other video recording hardware. The preexisting video file may be in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. The preexisting video file may be stored on a solid state disk drive, hard disk drive, random access memory, or some other digital storage medium. An upper and lower limit may be placed to on the preexisting video file to restrict the file size or the length of video.

The registered user may also choose to record a video instead of uploading a preexisting video file. The registered user may record the user generated video review with a digital camera, digital camcorder, a webcam, a tablet, a mobile phone, or some other video recording hardware. Video data may be sent live and piecemeal as a stream by the registered user and received by the host website. The streamed video data may be raw or compressed format.

The processor 207 executes the computer-readable instructions to receive a product tag associated with a reviewed product selected from the at least one reviewed product. The product tag may be created by the registered user as words or phrases which accurately describe the reviewed product. The product tag may include words or phrases identifying brand, model, size, color, visual traits, functional specifications, uses, and other descriptive text.

The processor 207 executes the computer-readable instructions to associate a product description to the reviewed product based on the product tag. In some embodiments, the product description contains text describing brand, model, size, color, visual traits, functional specifications, uses, and other descriptive information. The text may be obtained from the registered user, individuals experienced with the reviewed product, manufacturer or seller of the reviewed product, encyclopedia, journal, magazine, or product description database. In some embodiments, a product description search is executed to identify the product description. The product description search may search a description database or other digital sources using the product tag to identify an appropriate product description for the reviewed product.

The processor 207 executes the computer-readable instructions to approve said user generated video review if a set of criteria are met. The set of criteria helps ensure that the user generated video review is sufficiently useful to a viewer. Criterion may include suitability of product tags, length, visual quality, audio quality, clarity of speech, usefulness of review, identity of said reviewed product, or identity of said user account. The approval process for the user generated video review may be manual or may be partially or fully automated by a software algorithm. A user generated review that is not approved will not be published on the host website.

The processor 207 executes the computer-readable instructions to store said user generated video review to a database comprising a plurality of user generated video reviews. The user generated video review is stored as a video file in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. In some embodiments, the database includes at least one computer storage medium with a network connection to the host website.

The processor 207 executes the computer-readable instructions to publish the user generated video review. In some embodiments, the user generated video review is made available to all viewers of the host website and the user generated video review may be found and viewed by any viewer without a log-in process. In another embodiment, the user generated video review is made available to only a set of viewers and may only be viewed by viewers who have completed a log-in process.

The processor 207 executes the computer-readable instructions to provide an interface for a viewer of the user generated video review to purchase the reviewed product featured in the user generated video review. The user interface may be a hypertext transfer protocol link that allows the viewer to quickly navigate a browser to an external website to purchase the reviewed product. The user interface may allow the viewer to directly purchase the reviewed product from the host website using common tools of online shopping known in art. The user interface may also provide instructions on methods that the viewer may apply to purchase the reviewed product.

In some embodiments, the system includes a web application which publishes said user generated video review on an external website. The web application may be a software program for a video player to be embedded on the external website. It is contemplated that an external website containing a web content will use the web application to embed the video player to play a user generated video review featuring a reviewed product that is related to the web content. A user of the external website may view a user generated video review with the web application on the external website. In some embodiments, the system includes a mobile application which publishes said user generated video review on a mobile device. A user of the mobile device may view a user generated video review with the mobile application on the mobile device.

The processor 207 executes the computer-readable instructions to distribute an incentive to the user account associated with the user generated video review. Incentives may be distributed based on criteria such as but not limited to the number of approved user generated reviews received from the user account, the quality of the registered user's user generated video reviews, the number of views for the user generated video review, the ratings given by viewers of the user generated video review, or the number of people who "like" the user generated video review on a social networking website. Incentives may be distributed based on advertising revenue the host website received in connection with the user generated video review. Incentives may be distributed based on sales revenue received in connection with purchases of the reviewed product featured in the user generated video review. Incentives may be distributed based on licensing fees from third parties for access to the user generated review. In some embodiments, the incentive may include monetary sums and be distributed to the registered user by check, electronic wire transfer, store gift card, or online shopping credit. The incentive may include a visually distinguishable and prestigious design which highlights the registered user's reviewing abilities or the registered user's quality of video reviews. The incentive may include points which may be used for discounts on new products that are affiliated with the host website.

What is claimed is:

1. A non-transitory computer-readable medium storing executable instructions that when executed by a system including at least one computing device cause the system to perform operations comprising:
    generating a user account for a user;
    receiving a user generated video review associated with said user account, wherein said user generated video review comprises:
    a first segment, including audio and video data, featuring a first reviewed product, and
    a second segment, including audio and video data, featuring a second reviewed product;
    receiving from said user a first product tag associated with said first segment of the user generated video review, the first segment featuring said first reviewed product;
    receiving from said user a second product tag associated with said second segment of the user generated video review, the second segment featuring said second reviewed product;
    automatically approving said user generated video review if a set of criteria are met;
    storing said user generated video review, including said first segment and said second segment, to a database comprising a plurality of user generated video reviews;
    publishing said user generated video review;
    receiving a search query from a second user;
    identifying the first segment of said user generated video review if the search query corresponds to the first product tag associated with said first segment of said user generated video review;
    identifying the second segment of said user generated video review if the search query corresponds to the second product tag associated with said second segment of said user generated video review;
    determining an incentive to be distributed to said user based at least in part on:
    (i) sales revenue received in connection with purchase of the first reviewed product featured in the user generated video review, or
    (ii) sales revenue received in connection with purchases of the second reviewed product featured in the user generated video review, or
    (iii) licensing fees from third parties for access to the user generated review, or
    (iv) any combination or (i), (ii), (iii); and
    distributing said incentive to said user.

2. The computer-readable medium of claim 1, the operations further comprising: providing an interface for a viewer of said user generated video review to purchase: said first reviewed product, or said second reviewed product, or both said first reviewed product and said second reviewed product.

3. The computer-readable medium of claim 2, wherein said interface enables said viewer to click a tagged portion of a video display area of said user generated video review to purchase at least one of said first reviewed product or said second reviewed product, wherein said tagged portion is associated with said first reviewed product or said second reviewed product.

4. The computer-readable medium of claim 1, wherein said user generated video review comprises a audio and video data sent from a mobile device.

5. The computer-readable medium of claim 1, wherein receiving the user generated video review comprises receiving streamed video data.

6. The computer-readable medium of claim 1, wherein said user generated video review is received from an interactive kiosk located in a shopping center.

7. The computer-readable medium of claim 1, wherein receiving from said user a first product tag associated with said first reviewed product comprises receiving a barcode data by reading a barcode label and executing a product tag search based on said barcode data to determine the first product tag.

8. The computer-readable medium of claim 1, the operations further comprising automatically associating a product description to said first reviewed product based on said first product tag, wherein automatically associating a product description to said first reviewed product based on said first product tag comprises executing a product description search to identify said product description based on said first product tag.

9. The computer-readable medium of claim 1, wherein said first reviewed product is additionally associated with a tagged portion of a video display area of said user generated video review to enable a user to click said tagged portion of said video display area to purchase said first reviewed product.

10. The computer-readable medium of claim 1, the operations further comprising: providing a web application to publish said user generated video review on an external website.

11. The computer-readable medium of claim 1, the operations further comprising: providing a mobile application to publish said user generated video review on a mobile device.

12. The computer-readable medium of claim 1, the operations further comprising: providing a browser application to a browser, wherein said browser application publishes said user generated video review on said browser if a set of relevance criteria are met by said browser's displayed content.

13. The computer-readable medium of claim 1, the operations further comprising:
licensing said user generated video review to one or more third parties; and
providing access to said user generated review to said third one or more third parties.

14. The computer-readable medium of claim 1, the operations further comprising: associating a video rating to said user generated video review based on a collection of review quality input from viewers of said user generated video review.

15. The computer-readable medium of claim 1, the operations further comprising: associating a different segment rating, or different comments, or both a different segment rating and different comments, to each video segment in said user generated video review.

16. The computer-readable medium of claim 1, the operations further comprising: providing a social networking application wherein said social networking application publishes said user generated video review on a social networking website.

17. A product review system comprising:
a computer-readable medium comprising computer-readable instructions;
a communication network interface; and
a processor, wherein execution of said computer-readable instructions causes said processor to perform operations comprising:
generate a user account for a user;
receive, via the network interface, a user generated video review associated with said user account, wherein said user generated video review features at least a first reviewed product in a first segment and a second reviewed product in a second segment;
receive from said user a first product tag associated with said first segment of the user generated video review, the first segment featuring said first reviewed product selected from said at least one reviewed product;
receive from said user a second product tag associated with said second segment of the user generated video review, the second segment featuring said second reviewed product;
automatically approve said user generated video review if a set of criteria are met;
store said user generated video review to a database comprising a plurality of user generated video reviews;
publish said user generated video review;
receive a search query from a second user;
identify the first segment of said user generated video review if the search query corresponds to the first product tag associated with said first segment of said user generated video review;
identify the second segment of said user generated video review if the search query corresponds to the second product tag associated with said second segment of said user generated video review;
provide an interface for a viewer of said user generated video review to purchase said first reviewed product, or said second reviewed product, or both said first reviewed product and said second reviewed product;
determine an incentive to be distributed to said user based at least in part on:
(i) sales revenue received in connection with purchase of the first reviewed product featured in the user generated video review, or an
(ii) sales revenue received in connection with purchases of the second reviewed product featured in the user generated video review, or
(iii) licensing fees from third parties for access to the user generated review, or
(iv) any combination or (i), (ii), (iii); and
distribute said incentive to said user.

18. The system of claim 17, further comprising a web application which publishes said user generated video review on an external website.

19. The system of claim 17, further comprising a mobile application which publishes said user generated video review on a mobile device.

20. A method comprising:
generating, by a computer system, a user account for a user;
receiving, at the computer system, a user generated video review associated with said user account, wherein said user generated video review comprises:
a first segment, including audio and video data, featuring a first reviewed product, and
a second segment, including audio and video data, featuring a second reviewed product;

receiving, at the computer system, from said user a first product tag associated with said first segment of the user generated video review, the first segment featuring said first reviewed product;

receiving, at the computer system, from said user a second product tag associated with said second segment of the user generated video review, the second segment featuring said second reviewed product;

automatically_approving, by the computer system, said user generated video review if a set of criteria are met;

storing, by the computer system, said user generated video review, including said first segment and said second segment, to a database comprising a plurality of user generated video reviews;

publishing, by the computer system, said user generated video review;

receiving, by the computer system, a search query from a second user;

identifying, by the computer system, the first segment of said user generated video review if the search query corresponds to the first product tag associated with said first segment of said user generated video review;

identifying, by the computer system, the second segment of said user generated video review if the search query corresponds to the second product tag associated with said second segment of said user generated video review;

determining, by the computer system, an incentive to be distributed to said user based at least in part on:

(i) sales revenue received in connection with purchase of the first reviewed product featured in the user generated video review, or (ii) sales revenue received in connection with purchases of the second reviewed product featured in the user generated video review, or (iii) licensing fees from third parties for access to the user generated review, or (iv) any combination or (i), (ii), (iii); and distributing, by the computer system, said incentive to said user.

* * * * *

UNITED STATES PATENT AND TRADEMARK OFFICE
CERTIFICATE OF CORRECTION

| | | |
|---|---|---|
| PATENT NO. | : 8,635,169 B2 | Page 1 of 1 |
| APPLICATION NO. | : 13/451478 | |
| DATED | : January 21, 2014 | |
| INVENTOR(S) | : Avedissian et al. | |

It is certified that error appears in the above-identified patent and that said Letters Patent is hereby corrected as shown below:

In the Specification

In column 2 at line 56, Change "interne" to --internet--.

In the Claims

In column 12 at line 53, In Claim 1, change "purchase" to --purchases--.

In column 13 at line 9, In Claim 4, after "comprises" delete "a".

In column 14 at lines 17-18, In Claim 17, after "reviewed" delete "product selected from said at least one reviewed".

In column 14 at line 43, In Claim 17, change "purchase" to --purchases--.

In column 14 at line 45, In Claim 17, after "or" delete "an".

In column 15 at line 9, In Claim 20, change "automatically_approving," to --automatically approving,--.

In column 16 at line 9, In Claim 20, change "purchase" to --purchases--.

Signed and Sealed this
Seventh Day of October, 2014

Michelle K. Lee
*Deputy Director of the United States Patent and Trademark Office*